United States Patent [19]

Turney et al.

[11] Patent Number: 5,455,058

[45] Date of Patent: Oct. 3, 1995

[54] ETHYLENE SORBING SUBSTANCES

[75] Inventors: Terence W. Turney, Mount Waverley; Gregor B. Christie, Middle Park; Simon G. Hardin, North Fitzroy; Penelope A. Corrigan, Springvale South, all of Australia

[73] Assignee: Commonwealth Scientific & Industrial Research Org., Campbell, Australia

[21] Appl. No.: 306,531

[22] Filed: Sep. 15, 1994

Related U.S. Application Data

[63] Continuation of Ser. No. 949,835, Nov. 6, 1992, abandoned.

[30] Foreign Application Priority Data

Jun. 8, 1990 [AU] Australia ................... PK0572

[51] Int. Cl.$^6$ ................. A23L 3/00; B01J 20/00
[52] U.S. Cl. ............. 426/419; 426/124; 502/400; 502/410; 252/186.33
[58] Field of Search ............ 426/419, 124; 502/400, 410, 414; 252/186.24, 186.33

[56] References Cited

U.S. PATENT DOCUMENTS

| | | | |
|---|---|---|---|
| 4,337,276 | 6/1982 | Nakamura et al. | 426/124 |
| 4,448,760 | 5/1984 | Welsh et al. | 423/605 |
| 4,450,148 | 5/1984 | Welsh | 423/605 |
| 4,520,005 | 5/1985 | Yao | 423/599 |
| 4,845,958 | 7/1989 | Senda et al. | 62/418 |
| 4,906,398 | 3/1990 | Alvarez et al. | 252/186.33 |

FOREIGN PATENT DOCUMENTS

| | | |
|---|---|---|
| 0094983 | 5/1982 | European Pat. Off. . |
| 0255461 | 3/1987 | European Pat. Off. . |
| 0369275 | 6/1989 | European Pat. Off. . |

OTHER PUBLICATIONS

S. Ruben, Chemical Abstracts, 96: 76507y, 96, 519, (1982).
N. Yamamoto et al., Chemical Abstracts, 100: 184798d, 100, 640 (1984).
S. C. Douglas et al., Chemical Abstracts, 112: 162172r, 112, 230 (1990).
A–European Search Report Exhibit B–translation of EP 0 369 275.
Database WPIL; Derwent Publications Ltd., London, GB; AN 85–187995 & JP–A–60 118 175 (Shiraishi) *abstract*.

Primary Examiner—P Achutamurthy
Attorney, Agent, or Firm—Merchant, Gould, Smith, Edell, Welter & Schmidt

[57] ABSTRACT

A synthetic double-layered permanganate material including a synthetic double-layered hydroxide material modified such that permanganate anion is included to a level greater than approximately 20% of the theoretical anion exchange capacity of the hydroxide material within its interstices.

32 Claims, 2 Drawing Sheets

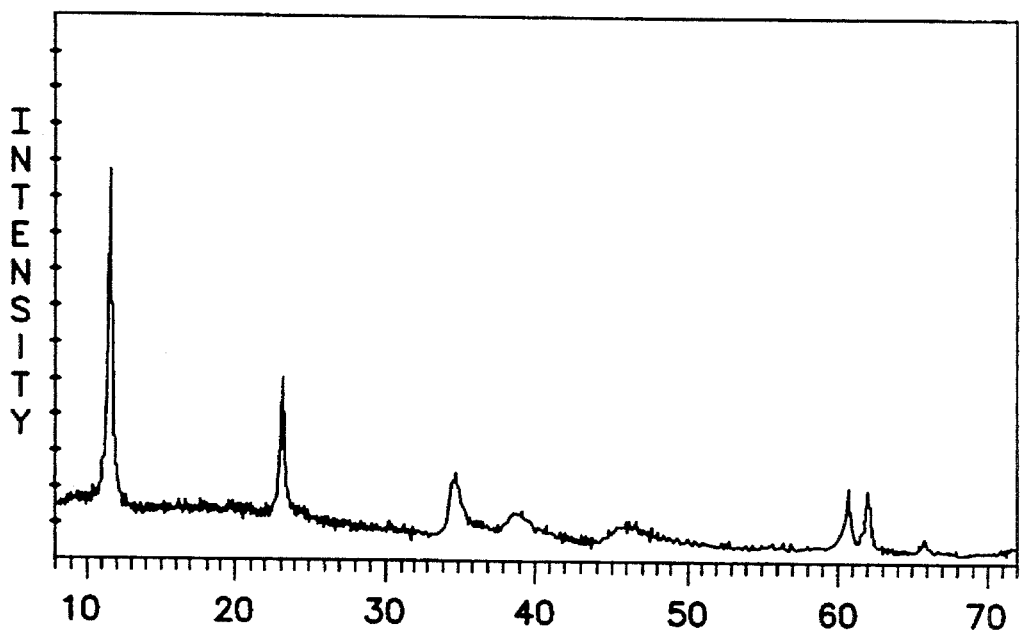
SAMPLE 0 S-776C
(MAX. INTENSITY = 3000 FILE = SJG6726) FIG. 1A
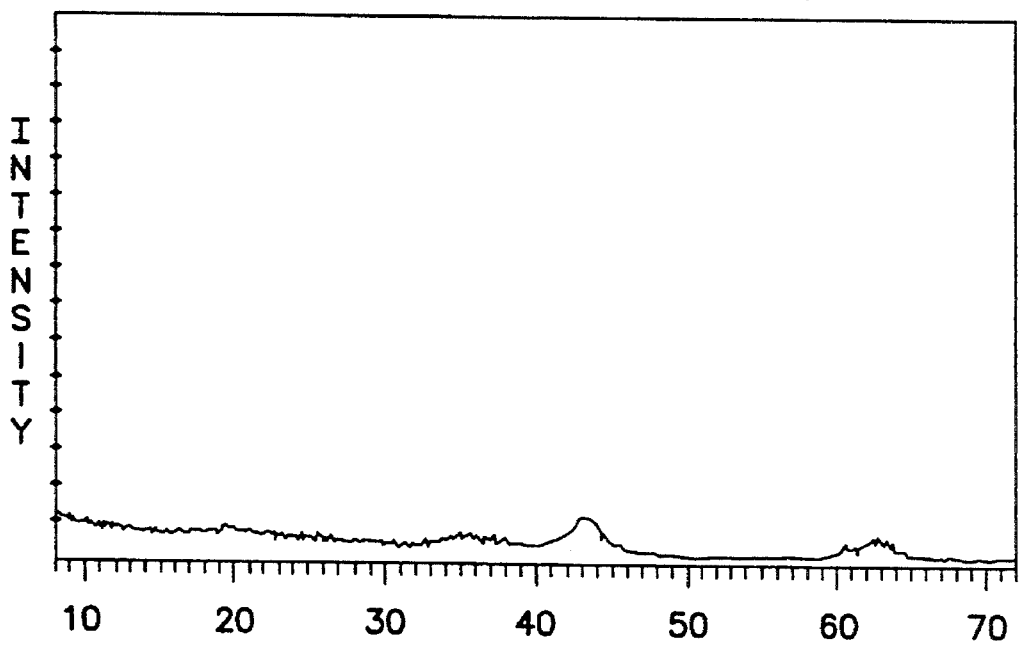
SAMPLE 3 S-776D
(MAX. INTENSITY = 3000 FILE = SJG6719) FIG. 1B

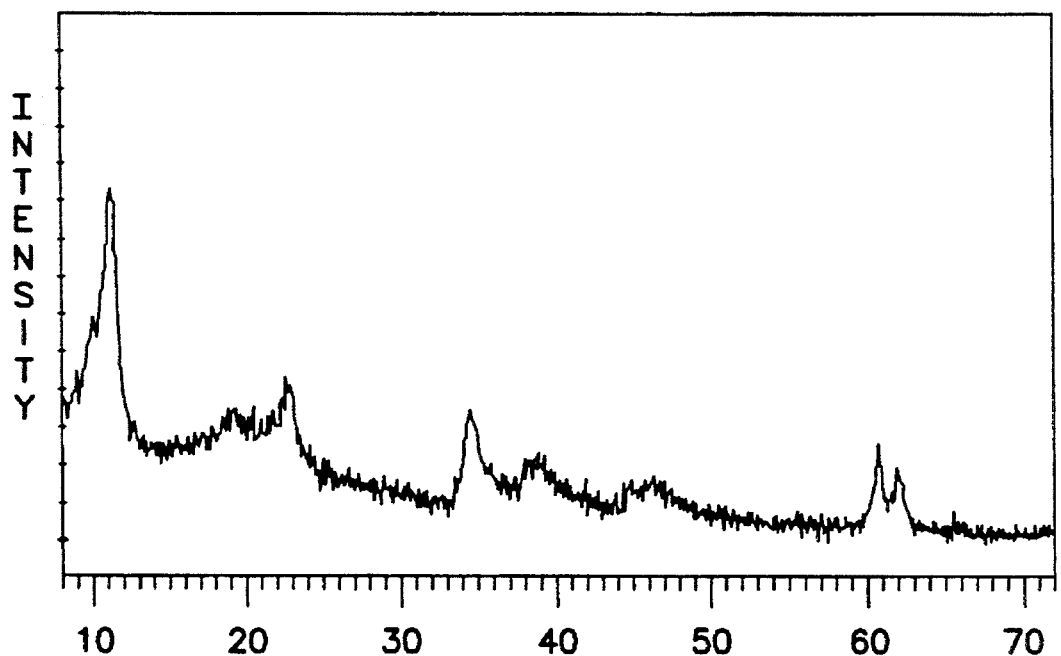
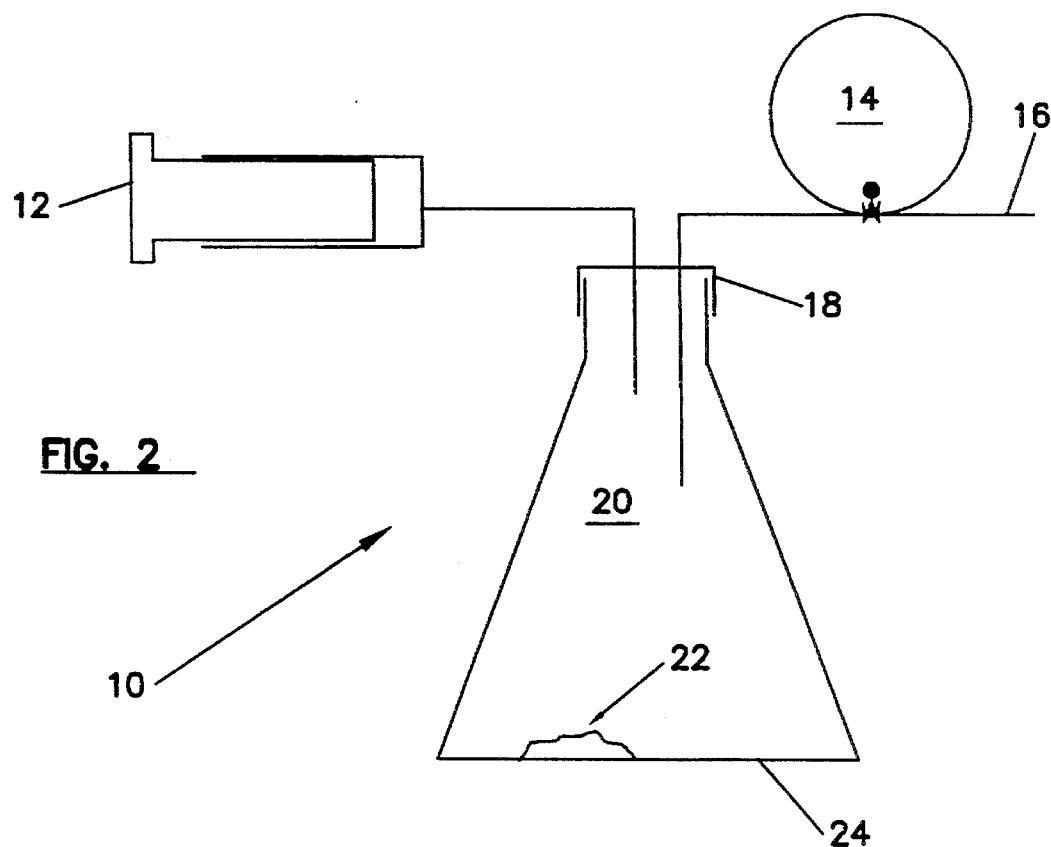

ETHYLENE SORBING SUBSTANCES

This is a continuation, of application Ser. No. 07/949,835, filed Nov. 6, 1992, now abandoned.

The present invention relates to new layered-double hydroxide materials and their use in a method for the removal of ethylene.

Ethylene is an important determinant of the storage life of produce including fruits, vegetables and flowers. The removal of ethylene from storage atmospheres with chemical scrubbers has been investigated for more than forty years. For example, potassium permanganate is a useful reagent for removing ethylene, which has been used both successfully both in apple storage rooms and as an in-transit package insert for bananas. Although the reaction between ethylene and permanganate has long been used as a qualitative test for alkenes and as a quantitative method for ethylene assay, ethylene is only removed slowly by dilute permanganate solutions. To overcome this difficulty, it has been suggested in the prior art to coat inert materials of large surface area with permanganate, dried, and used to remove ethylene. Materials which have been used as carriers for permanganate include celite, perlite, vermiculite, silica gel, rice-hull ash and alumina preparations.

Such permanganate coated materials have been partially successful. However, their success has been limited by the low loading of permanganate ion in such costs. Moreover, the permanganate ion may leach out if the materials become wet. This is a particular problem in the storage and transfer of produce, since these are often accompanied by an atmosphere of high humidity.

Accordingly it is an object of the present invention to overcome, or at least alleviate, one or more of the difficulties related to the prior art.

Accordingly, in a first aspect of the present invention, there is provided a synthetic layered-double permanganate material including a synthetic layered-double hydroxide material modified such that permanganate anion is included to a level greater than approximately 20% of the theoretical anion exchange capacity of the hydroxide material within its interstices.

Desirably, the permanganate anion is present in the material to a level of approximately 30% of, or greater than, the theoretical anion exchange capacity of the hydroxide material.

The synthetic layered-double permanganate material so formed may be a synthetic hydrotalcite-type compound, The synthetic layered-double permanganate material may function as an oxidising agent. The synthetic layered-double permanganate material may function to remove organic compounds including ethylene where required. The synthetic layered-double permanganate material may exhibit high permanganate ion loading relative to the prior art, and reduced sensitivity to water leaching.

The synthetic layered-double permanganate material may be represented by the idealised general formula $$M_mN_n(OH)_{2m+2n}(MnO_4)_{n-(a+2b+3c)}A_aB_bC_c \cdot xH_2O$$

wherein

M is divalent metal cation;
N is a trivalent metal cation;
A is a monovalent anion;
B is a divalent anion;
C is a trivalent anion;
m and n are numbers such that m/n has values of approximately 1 to approximately 6;
a, b, c and x are each numbers of from 0 to approximately 10.

Preferably M is a divalent metal cation selected from magnesium; nickel, iron and zinc, or mixtures thereof.

Preferably N is a trivalent metal cation selected from aluminium, iron, chromium or mixtures thereof.

Preferably A is a hydroxide ion.

Alternatively, or in addition, A and C may be selected from hydrophobic anions as discussed below.

Preferably synthetic layered-double permanganate material has the idealised general formula $$[Mg_{1-y}Al_y(OH)_2][(OH)_a(CO_3)_b(MnO_4)_{(y-a-2b)}] \cdot xH_2O$$

wherein $0.20 \leq y \leq 0.5$ and $0.2 \leq (x-a-2b)/x \leq 1.0$

The synthetic layered-double permanganate material may be selected from the following hydrotalcite like minerals $Mg_2Al_2(OH)_8(MnO_4)_2 \cdot 4H_2O$ $Mg_3Al_2(OH)_{10}(MnO_4)_2 \cdot 4H_2O$ $Mg_4Al_2(OH)_{12}(MnO_4)_2 \cdot 4H_2O$ $Mg_5Al_2(OH)_{14}(MnO_4)_2 \cdot 4H_2O$ $Mg_6Al_2(OH)_{16}(MnO_4)_2 \cdot 4H_2O$ $Mg_7Al_2(OH)_{18}(MnO_4)_2 \cdot 4H_2O$ $Mg_8Al_2(OH)_{20}(MnO_4)_2 \cdot 4H_2O$ $Mg_6Al_2(OH)_{16}[(CO_3)_{0.2}(MnO_4)_{1.6}] \cdot 4H_2O$ $Mg_6Al_2(OH)_{16}[(CO_3)_{0.8}(MnO_4)_{0.4}] \cdot 4H_2O$ $Mg_6Al_2(OH)_{16}[(OH)_{1.7}(MnO_4)_{0.3}] \cdot 4H_2O$ $Mg_6Al_2(OH)_{16}[(OH)_{0.3}(MnO_4)_{1.7}] \cdot 4H_2O$ $Mg_6Al_2(OH)_{16}[(CO_3)_{0.3}(OH)_{0.5}(MnO_4)_{0.9}] \cdot 4H_2O$ $Mg_6Fe_2(OH)_{16}(MnO_4)_2 \cdot 4H_2O$ $Mg_6Cr_2(OH)_{16}(MnO_4)_2 \cdot 4H_2O$ $Ni_6Al_2(OH)_{16}(MnO_4)_2 \cdot 4H_2O$ $Ca_6Al_2(OH)_{16}(MnO_4)_2 \cdot 4H_2O$ $Zn_6Al_2(OH)_{16}(MnO_4)_2 \cdot 4H_2O$ $Zn_6Al_2(OH)_{16}(MnO_4)_2 \cdot 4H_2O$ $LiAl_2(OH)_6(MnO_4) \cdot 5H_2O$ preferably $Mg_6Al_2(OH)_{16}(MnO_4)_2 \cdot 4H_2O$ In a preferred aspect of the present invention, the synthetic layered-double permanganate material may be modified to render it partially or substantially completely hydrophobic. The synthetic layered-double permanganate material may be modified in any suitable manner. The synthetic layered-double permanganate material may be coated with a hydrophobic material.

Accordingly in a preferred aspect of the present invention, the synthetic layered-double permanganate material is further modified to include a hydrophobic anion within its interstices. The hydrophobic anion may be derived from a long chain alkyl acid material. Long chain alkyl carboxylic acids, sulphonic acids, phosphoric or phosphonic acids may be used. A hydrophobic anion derived from a long chain alkyl carboxylic acid is preferred.

The synthetic layered-double permanganate material may be modified to include a hydrophobic anion or anions within its interstices at the same time or subsequent to the inclusion of the permanganate ion within its interstices.

The synthetic layered-double permanganate material may be utilised in the extension of storage life of produce as discussed below. For that purpose, the material may be provided in any suitable form. The material may be provided in a pelletised form. The material may be provided in the form of a sachet or in the form of a blanket. In the blanket form, the material may be designed to overlay the produce or produce packaging.

Accordingly, in a further aspect of the present invention there is provided an ethylene sorbing pellet composition including an effective amount of a synthetic layered-double permanganate material modified to include permanganate anions within its interstices; and a pelleting support.

The pelleting support may function to aid formation and provide improved stability, to the pellets so formed. The synthetic layered-double permanganate material may be of the type described above. The permanganate material is preferably $$Mg_6Al_2(OH)_6(MnO_4^-)_2 \cdot 4H_2O.$$

The permanganate material may be present in amounts of from approximately 70% to 95% by weight based on the total weight of the pellet composition.

The pelleting support may be of any suitable type. An organic or inorganic filler may be used. Alumina, silica or paraffins have been found to be suitable.

The amount of pelleting support is preferably kept to a minimum so that ethylene sorbing ability is not significantly diminished. The pelleting support may be present in amounts of from approximately 5% to 30% by weight based on the total weight of the pellet composition.

Accordingly in a further embodiment of the present invention there is provided an ethylene sorbing pellet composition including approximately 70 to 95% by weight based on the total weight of the pellet composition of a synthetic layered-double permanganate material in which M is selected from calcium, magnesium, nickel, iron and zinc, and N is a trivalent metal cation selected from aluminium, iron and chromium; and approximately 5 to 20% by weight based on the total weight of the pelleting composition of a pelleting support selected from alumina, silica and paraffins.

In a still further aspect of the present invention there is provided a method of preparing a synthetic layered-double permanganate material, which method includes
providing
a synthetic layered-double hydroxide material; and
a source of permanganate anions; and
mixing the synthetic layered-double hydroxide material and permanganate anions for a time sufficient to allow reaction therebetween.

The synthetic layered-double hydroxide material may be a hydrotalcite-like mineral. The hydrotalcite-like mineral may be derived from compounds having the general formula $$M_m N_n (OH)_{2m+2n} A_a \cdot bH_2O$$

wherein
M is a divalent metal cation;
N is a trivalent metal cation;
A is an hydroxyl ion or a mono-, di- or trivalent anion which decomposes to form hydroxyl ions;
m and n are integers such that m/n has values of approximately 1 to approximately 6;
a is an integer with the provisos that when A is a monovalent anion a=n, when A is a divalent anion a=½n, and when A is a trivalent anion a=⅓m; and
b is an integer having values of 0 to 10.

Preferably the hydrotalcite-like material is hydrotalcite having the formula $$Mg_6Al_2(OH)_{16}(CO_3^{2-}) \cdot 4H_2O$$

In this case preferably at least approximately 20%, more preferably approximately 50%, most preferably approximately 100% of the carbonate ion present is replaced by permanganate ion.

The source of permanganate ions may be potassium permanganate. The source of permanganate ions may be provided in the form of a solution. An aqueous solution may be used.

The hydrotalcite-like material and aqueous solution of permanganate ions may be mixed and allowed to react for a period up to approximately 10 days, preferably approximately 1 hour to 3 days. The reaction may be conducted at elevated temperatures in order to speed up processing. Treatment of the hydrotalcite-like material may be repeated several times, with fresh batches of permanganate each time.

The method of preparing the synthetic layered-double permanganate material may further include the preliminary step of heating the hydrotalcite-like material for a time sufficient and at a temperature sufficient to reduce or eliminate water of hydration and decompose any interlayer anions, such as carbonate ions.

The material may be heated to a temperature of approximately 300° to 900° C. In a preferred form the sample is initially heated in air at a temperature of approximately 300° to 400° C. for a period of approximately one to five hours. A final heat treatment is then conducted for a period of 1 to 2 hours at a temperature of approximately 400° to 600° C.

The method of preparing the synthetic layered-double permanganate material may further include the subsequent step of isolating the reaction product; and drying the reaction product.

The isolation step may include subjecting the extrusion solution to a centrifugation process. The drying step may include oven drying the product of centrifugation at a temperature of approximately 100° C. for approximately 2 to 3 hours.

In a preferred form, the reaction product may be formed into pellets. The pelleting step may be conducted in any suitable manner. Preferably the reaction product may be subjected to an extrusion step and dried to form pellets.

The strength of pellets so formed is improved.

As discussed above, the synthetic layered-double permanganate material prepared as described above may be utilized as an oxidation agent and in particular in the removal of organic compounds.

Accordingly, in a preferred aspect of the present invention there is provided a method for the extension of storage life of produce, Which method includes
providing
produce in a suitable storage container; and
a synthetic layered-double permanganate material including a synthetic layered-double hydroxide material modified to include permanganate anion within its interstices; and
placing the synthetic layered-double material within, or in communication with, the suitable storage container.

As discussed above, the synthetic layered-double permanganate material may be a material having the general formula $$M_m N_n (OH)_{2m+2n} (MnO_4)_{n-(a+2b+3c)} A_a B_b C_c \cdot xH_2O$$

wherein M, N, m, n and b are as described above.

Preferably, the synthetic layered-double hydroxide has the formula:

$$Mg_6Al_2(OH)_{16}(MnO_4^-)_2 \cdot 4H_2O$$

More preferably, the synthetic layered-double permanganate material may be a synthetic layered-double hydrophobic material, as discussed above. In a particularly preferred form, the synthetic layered-double hydrophobic material may be formed from the synthetic layered-double material described above, further modified by inclusion of hydrophobic anions derived from a long-chain alkyl carboxylic acid or alkyl sulphonic acid.

In a preferred form the synthetic layered-double material may be provided In a pelletised form. The material may be provided in the form of a sachet or in the form of a blanket. In the blanket form the material may be designed to overlay the produce or produce packaging.

Alternatively, or in addition, where the storage container is provided with a controlled atmosphere e.g. in a refrigerated container, the material may simply be in communication with the controlled atmosphere. The material may be contained in a cartridge or the like, with the atmosphere drawn over it by any suitable means. A pump or the like may be used.

BRIEF DESCRIPTION OF DRAWINGS

FIGS. 1A, 1B, and 1C are X-ray Diffraction Diagrams of samples of the hydroxide material prepared as described in the following examples.

FIG. 2 is a schematic diagram of the apparatus used for the measurement of the ethylene sorption (10) FIG. 2 shows a syringe (12) to push the sample through the G.C. that enters a 115 ML sample vessel (24) containing 10 PPM ethylene (20) and 0.005 G powder (22). The interior of the vessel is connected through a suba seal (18) to a sample loop (14) and the G.C. (16).

The present invention will now be more fully described with reference to the accompanying examples. It should be understood, however, that the description following is illustrative only and should not be taken in any way as a restriction on the generality of the invention described above.

EXAMPLE 1

Precursor Preparation

A mixture of $Mg(NO_3)_2 \cdot 6H_2O$ (2308 g) and $Al(NO_3)_3 \cdot 9H_2O$ (1125 g), dissolved in $H_2O$ (51), were added with vigorous stirring to NaOH (1080 g) and $Na_2CO_3$ (954 g), dissolved in $H_2O$ (51). The resultant white slurry was diluted with a further 5l of water and the mixture was stirred and heated to 100° C. for 18 hours. After cooling, the white product was separated by centrifugation, washed eight times with water (6l) and re-centrifuged each time, until the washings exhibited a conductivity of <2 milliSiemens per meter. The wet gel was dried on trays in an oven at 100° C. for 16 h, ground to −40 mesh and stored in sailed containers.

The powder XRD of the sample (FIG. 1a) exhibited a pronounced basal spacing at 7.74 Angstrom, indicative of a layered-double hydroxide.

Additive Preparation

A sample of the above material (300 g) was heated in air at 450°–500° C. for three hours, resulting in a weight loss to 195 g. Its XRD as shown in FIG. 1b is very broad and showed no basal spacing. 195 g of the heated sample was stirred with a solution of $KMnO_4$ (400 g) in water (4 liter) for 4 days, centrifuged down and washed with water (6×41 ml). After drying in an oven at 50° C. for 18 h, the purple powder was passed through a #100 mesh sieve. The XRD pattern of the resultant powder is shown in FIG. 1(c). The elemental analysis showed the Mg, Al and Mn content to be 22.4%, 7.8% and 4.5% (wt/wt) respectively. This indicates the $MnO_4-$ incorporated into the structure was 28% of the theoretical exchange capacity. The quantity of $C_2H_4$ reacted by the samples was 6.2 ml (STP) per 1 gram.

Washing 0.5 g of the potassium permanganate (5%) loaded adsorbent samples were dispersed in 10 ml of distilled water and stirred for 30 seconds. The mixture was filtered through a porous glass frit and the powder remaining on the frit was washed with a further 30 ml of distilled water. The washed powder was then tested for its capacity to adsorb ethylene.

The ethylene uptake after washing provides a comparative measure of the combined effects of leaching removing the active permanganate component and water saturation hampering the access of ethylene to the high area surface of the adsorbent.

The effects of moisture on the performance and leaching of the adsorbents is important because of the high humidity prevalent during the storage of produce.

Ethylene Sorption Testing

The apparatus used to measure the ethylene adsorption of the various scavengers is schematically shown in FIG. 2. The results obtained are used as a relative measure of the scavenger ability of the materials. A 115 ml conical glass beaker is loaded with 0.005 g of powder and then sealed with an unused suba seal. Air containing ethylene (1150 ppm) is injected through the suba seal to give a total concentration of 10 ppm in the beaker. The beaker is allowed to stand at constant temperature for seventeen hours before the ethylene concentration of the gas in the beaker is determined using a gas chromatograph. 3 ml of air is injected into the beaker which pushes 3 ml of the sample gas through a 1 ml sample loop on the gas chromatograph.

The reproducibility of the technique was determined by dosing nine empty conical flasks with ethylene and determining the ethylene concentration in four of the beakers within one hour of dosing. The other five flasks were left to stand for five days and the ethylene concentration was determined. The areas under the gas chromatograph peaks for the four flasks were 13296, 13749, 13105 and 13525 area units. The peak areas of the five flasks left to stand were 13342, 13734, 13425, 13039 and 13228 area units. This demonstrated that no leakage occured from the flasks and that the dosing and gas chromatograph techniques used give reproducible results.

The ethylene scavenging capacity of the various materials are quoted throughout the report as x %. This is the change in the area of the gas chromatograph peak over the seventeen hour period. Before each adsorption run at least one flask free of scavenger was tested as a blank to ensure the reproducibility of the results. The results are shown in Table

1.

TABLE 1

|  | adsorbent | adsorbent + KMNO$_4$ | adsorbent + KMNO$_4$ + washing |
| --- | --- | --- | --- |
| Permanganate crystals | — | 20.7% | — |
| Hydrotalcite | 0% | 83.3% | 12.9% |
| Hydrotalcite calcined and loaded with permanganate ions | 0% | 100% | 100% |
| ZSM5 high silica | 0% | 97.5% | 11.4% |
| Silica gel | 0% | 88.0% | 2.2% |
| Magnesium oxide | 0% | 100% | 25.3% |
| X zeolite Ca exchanged | 0% | 62.6% | 0% |
| X zeolite Na exchanged | — | — | 9.6% |
| Y zeolite H exchanged | — | — | 6.4% |
| Mordenite H exchanged | — | — | 1.4% |
| Mordenite Na exchanged | — | — | 0.7% |

EXAMPLE 2

A hydrotalcite containing permanganate was prepared using the same method as Example 1 except that the ageing period used for the hydrotalcite formation was 1 week instead of 18 hours. The quantity of $C_2H_4$ reacted by the sample was 7.8 ml (STP) per 1 gram. Elemental analysis showed the Mg, Al and Mn to be 20.5%, 7.5%, 6.3% (wt/wt) respectively. This represents 41% of the theoretical exchange capacity of a hydrotalcite with this Mg/Al ratio.

EXAMPLE 3

A hydrotalcite containing permanganate was prepared using the same method as in Example 2 except that 900 ml of 40 wt % NaMnO$_4$ was contacted with 43 g of calcined hydrotalcite and 34 g of 70% HClO$_4$ solution was added dropwise over 0.5 hours, instead of the KMnO$_4$ solution. The quantity of $C_2H_4$ reacted by the sample was 5.95 ml (STP) per 1 gram. The elemental analysis showed the Mg, Al and Mn to be 16.9%, 6.1%, 4.88% (wt/wt) respectively. This represents 39.4% of the theoretical exchange capacity of a hydrotalcite with this Mg/Al ratio.

EXAMPLE 4

Hydrotalcite containing permanganate was prepared with a Mg/Al ratio of 2:1. The method of Example 1 was used with the quantities changed to

| Magnesium nitrate hexahydrate | 137 g |
| --- | --- |
| Aluminum nitrate monohydrate | 100 g |
| (both in 60 ml of water) | |
| Sodium hydroxide | 75 g |
| Sodium carbonate | 42 g |
| (both in 100 ml of water) | | and the ageing period reduced to 18 hours. The hydrotalcite was dried at 50° C. for 18 hours, then heated to 500° C. for 2 hours. All the heating was carried out in air. The calcined hydrotalcite (10 g) was added to a 10% (wt/wt) solution of KMnO$_4$ (100 g) in water (1l). The mixture was sealed and stirred at room temperature for 3 days. The solid was separated from the solution by centrifugation and then washed by dispersing in 1l of distilled water and recentrifuging followed by decantation. This washing was repeated five times. The sample was dried at 80° C. overnight. The XRD analysis of this material showed a basal spacing of 8.6 and 7.9 Angstroms. Elemental analysis showed the Mg, Al and Mn to be 17.8%, 7.67% and 7.02% (wt/wt) respectively. This represents 45% of the theoretical exchange capacity of a hydrotalcite structure with this Mg/Al ratio (2:1). The quantity of $C_2H_4$ reacted by the material was 7.6 ml (STP) per 1 gram. The quantity of MnO$_4$ leached from the sample when 1 gram was stirred with 100 ml of distilled water for 10 min was 5.5 mg/g.

EXAMPLE 5

A material containing permangangate was prepared with a Mg:Al ratio of 3:2. The method of Example 4 was used with the quantities changed to

| Magnesium nitrate hexahydrate | 77 g |
| --- | --- |
| Aluminum nitrate monohydrate | 75 g |
| (both in 70 ml of water) | |
| Sodium hydroxide | 48 g |
| Sodium carbonate | 32 g |
| (both in 110 ml of water). | |

The material was calcined, contacted with KMnO$_4$ and washed by the same methods given in Example 4. The sample was dried at 50° C. overnight.

Elemental analysis showed the Mg, Al and Mn to be 19.1%, 9.25%, 6.66% (wt/wt) respectively. This analysis represents 35.4% of the theoretical ion exchange capacity of a hydrotalcite structure with this Mg/Al ratio. The quanitity of $C_2H_4$ reacted by the material was a 3.7 ml (STP) per 1 gram. The quantity of MnO$_4$— leached from the sample when 1 gram was stirred with 100 ml of distilled water for 10 min was 7.5 mg/g.

EXAMPLE 6

A hydrotalcite like material containing permanganate was prepared using Mg:Fe ratio of 3:1. The starting hydrotalcite was made by adding

| Magnesium nitrate hexahydrate | (153.9 g) and |
| --- | --- |
| Iron nitrate hydrate | (80.8 g) in |
| (both in 300 ml of water) | |
| to | |
| Sodium hydroxide | (72 g) and |
| Sodium carbonate | (31.8 g) in |
| (both in 100 ml of water) | |

The slurry was homogenized, charged into a 400 ml autoclave and heated and stirred at 125° C. for 18 hours. The hydrotalcite-like material was isolated by the same method used in Example 1.

The hydrotalcite was then calcined at 500° C. for 18 hours, contacted with permanganate and isolated by the same method used in Example 1.

Elemental analysis showed Mg, Fe and Mn to be 20.5%, 27.9%, 1.4% (wt/wt) respectively. The quantity of $C_2H_4$ reacted by the material was 3.1 ml (STP) per 1 gram.

EXAMPLE 7

A hydrotalcite like material containing permanganate was prepared using Ca:Al ratio of 3:1. The starting hydrotalcite like material was made by adding Calcium carbonate (60 g)

Aluminium turnings (5.4 g)

(both dissolved in 50 ml water and 150 ml of concentrated perchloric acid) to

Sodium hydroxide (72 g)
(in 50 ml of water). The slurry was homogenized, charged into a 400 ml autoclave and heated and stirred at 130° C. for 4 days. The hydrotalcite like material was washed in distilled water (1 l) six times and isolated by centrifugation. The material was then calcined at 500° C. for 18 hours. The solid (2 g) was contacted with $KMnO_4$ (5 g) in 50 ml of water for 18 hours. The solid was then washed in distilled water (250 ml) six times and then dried at 50° C.

The elemental analysis showed Ca, Al and Mn to be 26.9%, 7.57% and 6.04%. This represents 39.2% of the theoretical exchange capacity of the hydrotalcite like structure. The quantity of $C_2H_4$ reacted by the material was 7.1 ml (STP) per 1 gram.

EXAMPLE 8

Pellets were prepared from the hydrotalcite-permanganate materials by extruding the materials in a wet gel state through a 3 mm die and allowing the gel to then dry. The materials produced in Examples 1, 3, 4 and 5 were extruded into pellets by the above method. A 5th sample was produced by taking pellets produced in 1 and coating the pellets with a thin parafin film. The 6th and 7th samples are commercially available permanganate loaded pellets known as "bloom fresh" and "ethysorb" respectively. The elemental analysis of samples 6 and 7 is given in Table 2.

TABLE 2

| | Elemental Analysis (% wt/wt) | | | | |
|---|---|---|---|---|---|
| | Al | Sl | Ca | Na | Mn |
| Pellet sample 6 | 38 | 0 | 0.05 | 0.4 | 1.0 |
| Pellet sample 7 | 42.3 | 0 | 0.02 | 0.2 | 1.2 |

The leaching of $MnO_4^-$ from the pellets was determined by contacting 1 gram of pellets with 1000 ml of water for 10 min and determining the concentration of $MnO_4^-$ in the water by UV visible absorbance.

The results are given in Table 3.

TABLE 3

| Quantity of $MnO_4^-$ - leached from pellets on contact with water | |
|---|---|
| Sample | $MnO_4^-$ leached (mg/g) |
| 1 | 24.0 |
| 2 | 23.4 |
| 3 | 5.5 |
| 4 | 7.5 |
| 5 | 0.1 |
| 6 | 9.6 |
| 7 | 14.4 |

EXAMPLE 9

Pellets of hydrotalcite containing permanganate were prepared using binders. The attrition strength of these pellets was compared to two commercially available pellets. The hydrotalcite pellets containing permanganate were prepared by the method given in Example 8 and the binders used were added to the wet gel prior to extrusion. The material produced in Example 1 was used to produce the pellets. The binders added the wet gel were 10% sodium montmorillonite (sample 2), 25% gamma alumina (sample 3), 25% sodium montmorillinite (sample 4) and 25% silica (sample 5). Sample 1 was the extrudate produced without binder. Sample 6 is the material produced in Example 1 pressed to 3000 psi. Sample 7 is the "bloom fresh" pellets and sample 8 is the "Ethysorb" pellets. Elemental analysis is given in Table 2.

The attrition strength of the pellets was determined by weighing the powder smaller than 300 um produced with 1 g of pellets is shaken in a 4 cm dia×10 cm sample tube for 1 hour at 10 cycles/sec with an 8 mm amplitude. The results were given in Table 4.

TABLE 4

| Powder less than 300 um | |
|---|---|
| Sample | Powder (% wt) |
| 1 | 2 |
| 2 | 3 |
| 3 | 6 |
| 4 | 2 |
| 5 | 3 |
| 6 | 8 |
| 7 | 2 |
| 8 | 1 |

These results show that hydrotalcite based pellets produced by pressing are not as attrition resistant as pellets produced by extrusion of wet gels followed by drying. Further, that the use of these binders is not necessary and that the hydrotalcite based pellets are as attrition resistant as the commercially available pellets.

EXAMPLE 10

Ethylene reaction capacity of the powders and pellets was determined by sealing 0.05 g of powder or 1 g of pellets into a glass ampoule. The glass ampoule was sealed into a 130 ml flask when using powders and a 1 l flask when using pellets. The flasks were sealed with new rubber Suba seals. Pure ethylene was injected into the flasks; 0.5 ml for the powder samples and 10 ml for the pellet samples. The $C_2H_4$ concentration was accurately determined by taking 0.5 ml samples from the flasks and injecting into a gas chromatograph fitted with an alumina column and a flame ionization detector. The ampoules were then smashed by shaking the flasks. The $C_2H_4$ concentration was then determined accurately by the same method at 2 hour, 8 hour, 1 day, 2 day and 5 day intervals. The quantity of $C_2H_4$ reacted was thus determined. Blank flasks were treated in the same fashion to ensure leaks were not occurring. The ethylene uptake of various powders and pellets are given in Table 5 along with the $MnO_4$ loading of the samples.

TABLE 5

| Ethylene Uptake and $MnO_4$ loading | | |
|---|---|---|
| Sample | $C_2H_4$ Uptake ml(STP)/g | % Mn |
| Example 1 | 6.2 | 4.8 |
| Example 2 | 7.8 | 6.3 |
| Example 3 | 6.0 | 4.9 |
| Example 4 | 7.6 | 7.0 |
| Example 5 | 3.72 | 6.7 |
| Example 6 | 3.14 | 1.4 |
| Example 7 | 7.08 | 6.1 |
| Example 8 - sample 5 | 3.32 | — |
| Example 8 - sample 6 | 0.95 | 1.0 |
| Example 8 - sample 7 | 1.8 | 1.2 |

TABLE 5-continued

Ethylene Uptake and MnO₄ loading

| Sample | C₂H₄ Uptake ml(STP)/g | % Mn |
|---|---|---|
| *Example 8 - sample 6, washed twice | 0 | 0.23 |
| *Example 9 - sample 7, washed twice | 0 | 0.14 |

*washing was carried out by contacting 10 g of solid with 100 ml of water, stirring for ½ hour, centrifuging the mixture then decanting the water to leave the washed solid.

These results show that the hydrotalcite containing permanganage has 3 to 9 times the capacity of the commercially available samples. This capacity is retained even after the samples have been washed (the hydrotalcites containing permanganate were washed between 2 and 6 times during production) whereas the commercial samples lost their capacity after washing.

EXAMPLE 11

The hydrotalcite containing permanganate material produced in Example 2 and the commercially available "Bloomfresh" and "ethysorb" were ground into a powder and used to reduce the ethylene concentration of the atmosphere surrounding stored pears. The powders were all less than 300 um and larger than 106 um. The elemental analyses of the commercial materials are given in Table 2. The powders (0.5 g of each) were sealed into 8 cm×8 cm sachets with one wall of the sachet being spunbonded polyethylene (spunbonded polypropylene could also have been used) commercially available as Tyvek 10593 and the other wall being 50 um polyethylene film. Four pears were stored with one sachet in a sealed polyethylene bag. Eight replicas of each experiment were carried out. Another preferred packaging option was tested where the spunbonded polyethylene was heat sealed to the inside wall of the polyethylene bag and filled with 0.5 g of the powder thus avoiding the need for both a bag and a sachet. Table 6 gives the ethylene concentration in the bags for the various samples.

TABLE 6

C₂H₄ concentration bags of stored pears (ppm)

| Sample | Day 1 | Day 6 | Day 13 | Day 19 |
|---|---|---|---|---|
| No sachet | 5.2–17.0 | 5.3–18.1 | 7.5–22.2 | 16.4–55.8 |
| Sachet containing Bloomfresh | 1.0–2.8 | 1.8–4.3 | 4.1–18.4 | 29.1–52.1 |
| Sachet containing Ethysorb | 1.0–1.4 | 0.8–2.1 | 1.7–3.5 | 17.5–31.6 |
| Sachet containing Example 1 | 0.2–0.8 | 0.4–1.1 | 0.8–2.1 | 4.1–14.5 |
| Bag containing Example 1 | 0.2–0.7 | 0.3–1.1 | 0.6–2.7 | 3.5–16.3 |
| Temperature of storage | 0° C. | 0° C. | 0° C. | 10° C. |

Finally, it is to be understood that various other modifications and/or alterations may be made without departing from the spirit of the present invention as outlined herein.

We claim:

1. A synthetic layered-double permanganate material comprising a synthetic layered-double hydroxide material modified to include permanganate anion to a level greater than approximately 20% of the theoretical anion exchange capacity of the hydroxide material within its interstices, said permanganate material having the general formula:

$$M_mN_n(OH)_{2m+2n}(MnO_4)_{n-(a+2b)}A_aB_bxH_2O$$

wherein

M is divalent metal cation;

N is a trivalent metal cation;

A is a monovalent anion;

B is a divalent anion;

m and n are numbers between 1 and 10 such that m/n has value of approximately 1 to approximately 6;

a, b and x are each numbers of from 0 to approximately 10.

2. A permanganate material according to claim 1, wherein M is a divalent metal cation selected from the group consisting of magnesium, calcium, nickel, iron and zinc, and N is a trivalent metal cation selected from the group consisting of aluminum, iron and chromium.

3. A permanganate material according to claim 1, having the general formula:

$$[Mg_{1-y}Al_y(OH)_2][(OH)_a(CO_3)_b(MnO_4)_{(y-a-2b)}].xH_2O$$

wherein $0.20 \leq y \leq 0.5$ and $0.2 \leq (y-a-2b)/y \leq 1.0$.

4. A synthetic layered-double permanganate material comprising a synthetic layered-double hydroxide material modified to include permanganate anion to a level greater than approximately 20% of the theoretical anion exchange capacity of the hydroxide material within its interstices, said permanganate material having the general formula:

$$M_mN_n(OH)_{2m+2n}(MnO_4)_{n-(a+2b)}A_aB_bxH_2O$$

wherein

M is divalent metal cation;

N is a trivalent metal cation;

A is hydroxide;

B is carbonate;

m and n are numbers between 1 and 8 such that m/n has a value of between 1 and 4;

a, b and x are each numbers of from 0 to approximately 10.

5. A permanganate material according to claim 4, wherein M is a divalent metal cation selected from the group consisting of magnesium, calcium, nickel, iron and zinc, and N is a trivalent metal cation selected from the group consisting of aluminum, iron and chromium.

6. A permanganate material according to claim 4, having the general formula:

$$[Mg_{1-y}Al_y(OH)_2][(OH)_a(CO_3)_b(MnO_4)_{(y-a-2b)}].xH_2O$$

wherein $0.20 \leq y \leq 0.5$ and $0.2 \leq (y-a-2b)/y \leq 1.0$.

7. A permanganate material according to claim 2, selected from the group consisting of:

$Mg_2Al_2(OH)_8(MnO_4)_2.4H_2O$ $Mg_3Al_2(OH)_{10}(MnO_4)_2.4H_2O$ $Mg_4Al_2(OH)_{12}(MnO_4)_2.4H_2O$ $Mg_5Al_2(OH)_{14}(MnO_4)_2.4H_2O$ $Mg_6Al_2(OH)_{16}(MnO_4)_2.4H_2O$ $Mg_7Al_2(OH)_{18}(MnO_4)_2.4H_2O$ $Mg_8Al_2(OH)_{20}(MnO_4)_2.4H_2O$ $Mg_6Al_2(OH)_{16}[(CO_3)_{0.2}(MnO_4)_{1.6}].4H_2O$
$Mg_6Al_2(OH)_{16}[(CO_3)_{0.8}(MnO_4)_{0.4}].4H_2O$
$Mg_6Al_2(OH)_{16}[(OH)_{1.7}(MnO_4)_{0.3}].4H_2O$
$Mg_6Al_2(OH)_{16}[(OH)_{0.3}(MnO_4)_{1.7}].4H_2O$
$Mg_6Al_2(OH)_{16}[(CO_3)_{0.3}(OH)_{0.5}(MnO_4)_{0.9}].4H_2O$
$Mg_6Fe_2(OH)_{16}(MnO_4)_2.4H_2O$
$Mg_6Cr_2(OH)_{16}(MnO_4)_2.4H_2O$
$Ni_6Al_2(OH)_{16}(MnO_4)_2.4H_2O$
$Ca_6Al_2(OH)_{16}(MnO_4)_2.4H_2O$
$Zn_6Al_2(OH)_{16}(MnO_4)_2.4H_2O$
$Zn_6Al_2(OH)_{16}(MnO_4)_2.4H_2O$ and
$LiAl_2(OH)_6(MnO_4).5H_2O$.

8. A permanganate material according to claim 5, selected from the group consisting of:

$Mg_2Al_2(OH)_8(MnO_4)_2.4H_2O$
$Mg_3Al_2(OH)_{10}(MnO_4)_2.4H_2O$
$Mg_4Al_2(OH)_{12}(MnO_4)_2.4H_2O$
$Mg_5Al_2(OH)_{14}(MnO_4)_2.4H_2O$
$Mg_6Al_2(OH)_{16}(MnO_4)_2.4H_2O$
$Mg_7Al_2(OH)_{18}(MnO_4)_2.4H_2O$
$Mg_8Al_2(OH)_{20}(MnO_4)_2.4H_2O$
$Mg_6Al_2(OH)_{16}[(CO_3)_{0.2}(MnO_4)_{1.6}].4H_2O$
$Mg_6Al_2(OH)_{16}[(CO_3)_{0.8}(MnO_4)_{0.4}].4H_2O$
$Mg_6Al_2(OH)_{16}[(OH)_{1.7}(MnO_4)_{0.3}].4H_2O$
$Mg_6Al_2(OH)_{16}[(OH)_{0.3}(MnO_4)_{1.7}].4H_2O$
$Mg_6Al_2(OH)_{16}[(CO_3)_{0.3}(OH)_{0.5}(MnO_4)_{0.9}].4H_2O$
$Mg_6Fe_2(OH)_{16}(MnO_4)_2.4H_2O$
$Mg_6Cr_2(OH)_{16}(MnO_4)_2.4H_2O$
$Ni_6Al_2(OH)_{16}(MnO_4)_2.4H_2O$
$Ca_6Al_2(OH)_{16}(MnO_4)_2.4H_2O$
$Zn_6Al_2(OH)_{16}(MnO_4)_2.4H_2O$
$Zn_6Al_2(OH)_{16}(MnO_4)_2.4H_2O$ and
$LiAl_2(OH)_6(MnO_4).5H_2O$.

9. An ethylene sorbing pellet composition including an effective amount of a synthetic layered-double permanganate material as claimed in claim 1; and a pelleting support.

10. An ethylene sorbing pellet composition including an effective amount of a synthetic layered-double permanganate material as claimed in claim 4; and a pelleting support.

11. An ethylene sorbing pellet composition including approximately 70 to 95% by weight based on the total weight of the pellet composition of a synthetic layered-double permanganate material as claimed in claim 3; and approximately 5 to 30% by weight based on the total weight of the pelleting composition of a pelleting support selected frown the group consisting of alumina, silica and paraffins.

12. An ethylene sorbing pellet composition including approximately 70 to 95% by weight based on the total weight of the pellet composition of a synthetic layered-double permanganate material as claimed in claim 6; and approximately 5 to 30% by weight based on the total weight of the pelleting composition of a pelleting support selected from the group consisting of alumina, silica and paraffins.

13. A pellet composition according to claim 11, including from approximately 70 to 95% by weight based on the total weight of the pellet composition of a permanganate material selected from the group consisting of:

$Mg_2Al_2(OH)_8(MnO_4)_2.4H_2O$
$Mg_3Al_2(OH)_{10}(MnO_4)_2.4H_2O$
$Mg_4Al_2(OH)_{12}(MnO_4)_2.4H_2O$
$Mg_5Al_2(OH)_{14}(MnO_4)_2.4H_2O$
$Mg_6Al_2(OH)_{16}(MnO_4)_2.4H_2O$
$Mg_7Al_2(OH)_{18}(MnO_4)_2.4H_2O$
$Mg_8Al_2(OH)_{20}(MnO_4)_2.4H_2O$
$Mg_6Al_2(OH)_{16}[(CO_3)_{0.2}(MnO_4)_{1.6}].4H_2O$
$Mg_6Al_2(OH)_{16}[(CO_3)_{0.8}(MnO_4)_{0.4}].4H_2O$
$Mg_6Al_2(OH)_{16}[(OH)_{1.7}(MnO_4)_{0.3}].4H_2O$
$Mg_6Al_2(OH)_{16}[(OH)_{0.3}(MnO_4)_{1.7}].4H_2O$
$Mg_6Al_2(OH)_{16}[(CO_3)_{0.3}(OH)_{0.5}(MnO_4)_{0.9}].4H_2O$
$Mg_6Fe_2(OH)_{16}(MnO_4)_2.4H_2O$
$Mg_6Cr_2(OH)_{16}(MnO_4)_2.4H_2O$
$Ni_6Al_2(OH)_{16}(MnO_4)_2.4H_2O$
$Ca_6Al_2(OH)_{16}(MnO_4)_2.4H_2O$
$Zn_6Al_2(OH)_{16}(MnO_4)_2.4H_2O$
$Zn_6Al_2(OH)_{16}(MnO_4)_2.4H_2O$ and
$LiAl_2(OH)_6(MnO_4).5H_2O$ and from 5 to 30% by weight based on the total weight of the pellet composition of a pelleting support selected from alumina, silica and paraffins.

14. A pellet composition according to claim 12, including from approximately 70 to 95% by weight based on the total weight of the pellet composition of a permanganate material selected from the group consisting of:

$Mg_2Al_2(OH)_8(MnO_4)_2.4H_2O$
$Mg_3Al_2(OH)_{10}(MnO_4)_2.4H_2O$
$Mg_4Al_2(OH)_{12}(MnO_4)_2.4H_2O$
$Mg_5Al_2(OH)_{14}(MnO_4)_2.4H_2O$
$Mg_6Al_2(OH)_{16}(MnO_4)_2.4H_2O$
$Mg_7Al_2(OH)_{18}(MnO_4)_2.4H_2O$
$Mg_8Al_2(OH)_{20}(MnO_4)_2.4H_2O$
$Mg_6Al_2(OH)_{16}[(CO_3)_{0.2}(MnO_4)_{1.6}].4H_2O$
$Mg_6Al_2(OH)_{16}[(CO_3)_{0.8}(MnO_4)_{0.4}].4H_2O$
$Mg_6Al_2(OH)_{16}[(OH)_{1.7}(MnO_4)_{0.3}].4H_2O$
$Mg_6Al_2(OH)_{16}[(OH)_{0.3}(MnO_4)_{1.7}].4H_2O$
$Mg_6Al_2(OH)_{16}[(CO_3)_{0.3}(OH)_{0.5}(MnO_4)_{0.9}].4H_2O$
$Mg_6Fe_2(OH)_{16}(MnO_4)_2.4H_2O$
$Mg_6Cr_2(OH)_{16}(MnO_4)_2.4H_2O$
$Ni_6Al_2(OH)_{16}(MnO_4)_2.4H_2O$
$Ca_6Al_2(OH)_{16}(MnO_4)_2.4H_2O$
$Zn_6Al_2(OH)_{16}(MnO_4)_2.4H_2O$
$Zn_6Al_2(OH)_{16}(MnO_4)_2.4H_2O$ and
$LiAl_2(OH)_6(MnO_4).5H_2O$ and from 5–30% by weight based on the total weight of the pellet composition of a pelletizing support selected from alumina, silica and paraffins.

15. A method of preparing a synthetic layered-double permanganate material, which method includes providing a synthetic layered-double hydroxide material having the general formula:

$$M_mN_n(OH)_{2m+2n}A_a.bH_2O$$

wherein:

M is a divalent metal cation;

N is a trivalent metal cation;

A is an hydroxyl ion or a mono- or divalent anion which decomposes to form hydroxyl ions;

m and n are integers between 1 and 10 such that m/n has values of approximately 1 to approximately 6;

a is an integer with the provisos that when A is a monovalent anion a=n and when A is a divalent anion a=½n, and b is an integer having values of 0 to 10; and a source of permanganate anions; and mixing the synthetic layered-double hydroxide material and permanganate anions for a time sufficient to allow reaction therebetween.

16. A method of preparing a synthetic layered-double permanganate material, which method includes providing a synthetic layered-double hydroxide material having the general formula:

$$M_m N_n (OH)_{2m+2n} A_a \cdot bH_2O$$

wherein:

M is a divalent metal cation;

N is a trivalent metal cation;

A is an hydroxyl ion or a mono- or divalent anion which decomposes to form hydroxyl ions;

m and n are integers between 1 and 8 such that m/n has values of approximately 1 to approximately 4;

a is an integer with the provisos that when A is a monovalent anion a=n and when A is a divalent anion a=½n, and b is an integer having values of 0 to 10; and a source of permanganate anions; and mixing the synthetic layered-double hydroxide material and permanganate anions for a time sufficient to allow reaction therebetween.

17. A method according to claim 15, wherein the synthetic layered-double hydroxide material is mixed with an aqueous solution of permanganate ions for a period of approximately 1 hour to 3 days.

18. A method according to claim 16, wherein the synthetic layered-double hydroxide material is mixed with an aqueous solution of permanganate ions for a period of approximately 1 hour to 3 days.

19. A method according to claim 17, which method further includes the preliminary step of heating the synthetic layered-double hydroxide material for a time sufficient and at a temperature sufficient to reduce or eliminate water of hydration and decompose interlayer anions.

20. A method according to claim 18, which method further includes the preliminary step of heating the synthetic layered-double hydroxide material for a time sufficient and at a temperature sufficient to reduce or eliminate water of hydration and decompose interlayer anions.

21. A method according to claim 17, wherein the hydroxide material is heated to a temperature of approximately 300° to 550° C.

22. A method according to claim 19, wherein the hydroxide material is heated to a temperature of approximately 300° to 550° C.

23. A method according to claim 15, further including the subsequent steps of isolating the reaction product and drying the reaction product.

24. A method according to claim 16, further including the subsequent steps of isolating the reaction product and drying the reaction product.

25. A method for the extension of storage life of produce comprising providing a produce in a storage container; and a synthetic layered-double permanganate as claimed in claim 1; and placing the permanganate material within, or in communication with, the said storage container.

26. A method for the extension of storage life produce, which method includes providing a produce in a storage container; and a synthetic layered-double permanganate as claimed in claim 4; and placing the permanganate material within, or in communication with, the said storage container.

27. A method according to claim 25, wherein the permanganate material has the general formula $$[Mg_{1-y}Al_y(OH)_2][(OH)_a(CO_3)_b(MnO_4)_{(y-a-2b)}] \cdot xH_2O$$

wherein $0.20 \leq y \leq 0.5$ and $0.2 \leq (y-a-2b)/y \leq 1.0$

28. A method according to claim 26, wherein the permanganate material has the general formula:

$$[Mg_{1-y}Al_y(OH)_2][(OH)_a(CO_3)_b(MnO_4)_{(y-a-2b)}] \cdot xH_2O$$

wherein $0.20 \leq y \leq 0.5$ and $0.2 \leq (y-a-2b)/y \leq 1.0$.

29. A method according to claim 27, wherein the permanganate material is selected from the group consisting of $Mg_2Al_2(OH)_8(MnO_4)_2 \cdot 4H_2O$ $Mg_3Al_2(OH)_{10}(MnO_4)_2 \cdot 4H_2O$ $Mg_4Al_2(OH)_{12}(MnO_4)_2 \cdot 4H_2O$ $Mg_5Al_2(OH)_{14}(MnO_4)_2 \cdot 4H_2O$ $Mg_6Al_2(OH)_{16}(MnO_4)_2 \cdot 4H_2O$ $Mg_7Al_2(OH)_{18}(MnO_4)_2 \cdot 4H_2O$ $Mg_8Al_2(OH)_{20}(MnO_4)_2 \cdot 4H_2O$ $Mg_6Al_2(OH)_{16}[(CO_3)_{0.2}(MnO_4)_{1.6}] \cdot 4H_2O$ $Mg_6Al_2(OH)_{16}[(CO_3)_{0.8}(MnO_4)_{0.4}] \cdot 4H_2O$ $Mg_6Al_2(OH)_{16}[(OH)_{1.7}(MnO_4)_{0.3}] \cdot 4H_2O$ $Mg_6Al_2(OH)_{16}[(OH)_{0.3}(MnO_4)_{1.7}] \cdot 4H_2O$ $Mg_6Al_2(OH)_{16}[(CO_3)_{0.3}(OH)_{0.5}(MnO_4)_{0.9}] \cdot 4H_2O$ $Mg_6Fe_2(OH)_{16}(MnO_4)_2 \cdot 4H_2O$ $Mg_6Cr_2(OH)_{16}(MnO_4)_2 \cdot 4H_2O$ $Ni_6Al_2(OH)_{16}(MnO_4)_2 \cdot 4H_2O$ $Ca_6Al_2(OH)_{16}(MnO_4)_2 \cdot 4H_2O$ $Zn_6Al_2(OH)_{16}(MnO_4)_2 \cdot 4H_2O$ $Zn_6Al_2(OH)_{16}(MnO_4)_2 \cdot 4H_2O$ and $LiAl_2(OH)_6(MnO_4) \cdot 5H_2O$.

30. A method according to claim 29, wherein the permanganate material is provided in the form of pellets.

31. A method according to claim 28, wherein the permanganate material is selected from the group consisting of $Mg_2Al_2(OH)_8(MnO_4)_2 \cdot 4H_2O$ $Mg_3Al_2(OH)_{10}(MnO_4)_2 \cdot 4H_2O$ $Mg_4Al_2(OH)_{12}(MnO_4)_2 \cdot 4H_2O$ $Mg_5Al_2(OH)_{14}(MnO_4)_2 \cdot 4H_2O$ $Mg_6Al_2(OH)_{16}(MnO_4)_2 \cdot 4H_2O$ $Mg_7Al_2(OH)_{18}(MnO_4)_2 \cdot 4H_2O$ $Mg_8Al_2(OH)_{20}(MnO_4)_2 \cdot 4H_2O$ $Mg_6Al_2(OH)_{16}[(CO_3)_{0.2}(MnO_4)_{1.6}] \cdot 4H_2O$ $Mg_6Al_2(OH)_{16}[(CO_3)_{0.8}(MnO_4)_{0.4}] \cdot 4H_2O$ $Mg_6Al_2(OH)_{16}[(OH)_{1.7}(MnO_4)_{0.3}] \cdot 4H_2O$ $Mg_6Al_2(OH)_{16}[(OH)_{0.3}(MnO_4)_{1.7}] \cdot 4H_2O$ $Mg_6Al_2(OH)_{16}[(CO_3)_{0.3}(OH)_{0.5}(MnO_4)_{0.9}] \cdot 4H_2O$ $Mg_6Fe_2(OH)_{16}(MnO_4)_2 \cdot 4H_2O$ $Mg_6Cr_2(OH)_{16}(MnO_4)_2 \cdot 4H_2O$ $Ni_6Al_2(OH)_{16}(MnO_4)_2 \cdot 4H_2O$ $Ca_6Al_2(OH)_{16}(MnO_4)_2 \cdot 4H_2O$ $Zn_6Al_2(OH)_{16}(MnO_4)_2 \cdot 4H_2O$ $Zn_6Al_2(OH)_{16}(MnO_4)_2 \cdot 4H_2O$ and $LiAl_2(OH)_6(MnO_4) \cdot 5H_2O$.

32. A method according to claim 31, wherein the permanganate material is provided in the form of pellets.

* * * * *